United States Patent
Huang

(10) Patent No.: US 12,554,393 B1
(45) Date of Patent: Feb. 17, 2026

(54) METHOD OF EXTENDED REALITY OPERATION FOR IMPROVING OPERATION EXPERIENCE AND SYSTEM THEREOF

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Wen-Hui Huang, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 19/092,094

(22) Filed: Mar. 27, 2025

(30) Foreign Application Priority Data

Nov. 28, 2024 (CN) .......................... 202411753299.8

(51) Int. Cl.
*G06F 3/0488* (2022.01)
*G06T 19/00* (2011.01)

(52) U.S. Cl.
CPC .......... *G06F 3/0488* (2013.01); *G06T 19/006* (2013.01)

(58) Field of Classification Search
CPC ...... G06T 19/006; G06F 3/011; G06F 3/0488; G02B 27/017
See application file for complete search history.

(56) References Cited

U.S. PATENT DOCUMENTS

2017/0336882 A1* 11/2017 Tome .................. G06F 3/03547

\* cited by examiner

*Primary Examiner* — Koosha Sharifi-Tafreshi
(74) *Attorney, Agent, or Firm* — ScienBiziP, P.C.

(57) ABSTRACT

A method of extended reality (XR) operation for improving operation experience applied in an XR operation system includes a terminal device and an XR device. The terminal device establishes a communication connection with the XR device after a started predefined program. The XR device transmits an Inertial Measurement Unit (IMU) switched-on instruction, which indicates that an IMU function is started, to the terminal device in response to starting the IMU function. The terminal device acquires IMU data and transmits the IMU data to the XR device in response to the touch switched-on instruction. The XR device receives the IMU data, displays a cursor, and controls a movement of the cursor based on the IMU data. A method of XR operation is also provided.

17 Claims, 5 Drawing Sheets

METHOD OF EXTENDED REALITY OPERATION FOR IMPROVING OPERATION EXPERIENCE AND SYSTEM THEREOF

TECHNICAL FIELD

The present application generally relates to extended reality technology, and particularly to a method of extended reality operation and a system thereof.

BACKGROUND

Extended reality (XR) technology is a technology which combines reality with virtual by a computer to form a virtual environment of human-machine interaction, and provides a seamless transition between virtual world and reality world to users. In a related art, the XR device generally executes the human-machine interaction in a manner, such as detecting an eye movement of the users, detecting a gesture of the users, or operating a hand shank, a speed and an accuracy in the human-machine interaction are low, which causes a user experience to be poor.

There is room for improvement in the art.

BRIEF DESCRIPTION OF THE DRAWINGS

Implementations of the present application will now be described, by way of example only, with reference to the attached figures.

DETAILED DESCRIPTION

Figure 1:
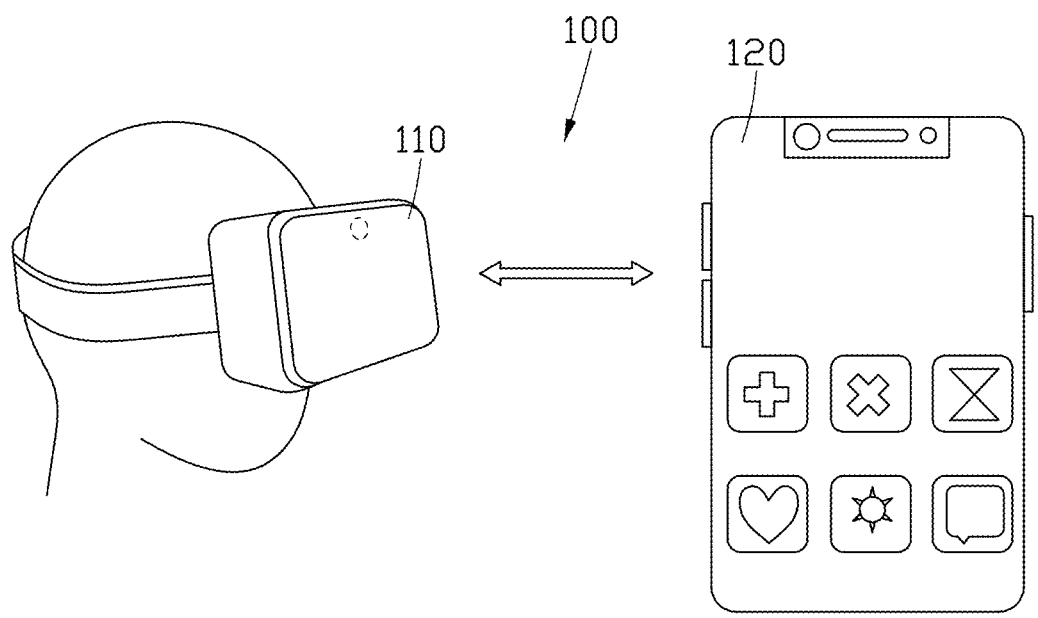
FIG. 1 is a diagram illustrating an embodiment of an extended reality operation system, according to the present application.

The present disclosure is described with reference to accompanying drawings and the embodiments. It will be understood that the specific embodiments described herein are merely part of all embodiments, not all the embodiments. Based on the embodiments of the present disclosure, it is understandable to a person skilled in the art, any other embodiments obtained by persons skilled in the art without creative effort shall all fall into the scope of the present disclosure. It will be understood that the specific embodiments described herein are merely some embodiments and not all.

It should be understood that, the term "at least one" of the present application means one or multiple. The term "multiple" means two or more. The term "multiple" means two or more. The term "and/or" of the present application merely describes associations between associated objects, and it indicates three types of relationships. For example, "A and/or B" may indicate A alone, A and B, or B alone. "A" and "B" may be singular or plural, respectively. In the description of the present application, the terms such as "first", or "second", "third", "fourth" (if exist), and the like are used only to distinguish between different objects, and are not to be understood as indicating or implying a relative importance or implicitly specifying the number, particular order, or primary and secondary relation of the technical features indicated.

In addition, it should be noted that the methods disclosed in the embodiments of the present disclosure or the methods shown in the flowcharts include one or more blocks for implementing the methods, and the one or more blocks are not deviated from the scope of the claims. The order of execution can be interchanged with each other, and some of the one or more blocks can also be deleted.

In general, the word "module," as used herein, refers to logic embodied in hardware or firmware, or to a collection of software instructions, written in a programming language, for example, Java, C, or assembly. One or more software instructions in the modules may be embedded in firmware, such as an EPROM, magnetic, or optical drives. It will be appreciated that modules may comprise connected logic units, such as gates and flip-flops, and may comprise programmable units, such as programmable gate arrays or processors, such as a CPU. The modules described herein may be implemented as either software and/or hardware modules and may be stored in any type of computer-readable medium or other computer storage systems. The term "comprising" means "including, but not necessarily limited to"; it specifically indicates open-ended inclusion or membership in a so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one."

Extended reality (XR) technology is a technology which combines reality with virtual by a computer to form a virtual environment of human-machine interaction, and provides a seamless transition between virtual world and reality world to users. In a related art, the XR device generally executes the human-machine interaction in a manner, such as detecting an eye movement of the users, detecting a gesture of the users, or operating a hand shank, a speed and an accuracy in the human-machine interaction are low, which causes an user experience to be poor.

The present application provides an extended reality (XR) operation system and a method of XR operation, for improving a interaction speed of the XR operation system and improving an accuracy of the operation of the cursor by the XR device, therefore an operation experience of the XR device is improved to users.

Referring to FIG. 1, FIG. 1 shows a diagram of an embodiment of an XR operation system provided by the present application. The XR operation system 100 includes an XR device 110 and a terminal device 120.

In one embodiment, a communication connection is established between the XR device 110 and the terminal device 120. The XR device 110 includes a head mounted display device, which includes components, such as a display, a camera, a processor, and a battery, and so on. The terminal device 120 includes a mobile and a tablet computer, and the like, but not being limited.

The terminal device 120 establishes a communication connection with the XR device 110 after starting a predefined program. In that means, the terminal device 120 pre-stores the predefined program. The users also may start the predefined program on the terminal device 120 after the XR device 110 is started, and starts the predefined program on the terminal device 120. Using the predefined program, a communication connection is established between the terminal device 120 and the XR device 110.

After the communication connection is established, the XR device 110 may display an option of Inertial Measurement Unit (IMU) function on the display of the XR device 110. After the users have selected the IMU function, the XR device 110 transmits an IMU switched-on instruction, which indicates that the IMU function is started while the user has selected the option of IMU function, to the terminal device 120 in response to stating the IMU function. The terminal device 120 responds to the IMU switched-on instruction after receiving the IMU switched-on instruction and acquires IMU data in real time and transmits the IMU data to the XR device 110. The XR device 110 receives the IMU data of the terminal device 120. The XR device 110 displays a cursor and controls a movement of the cursor based on the IMU data. Therefore, an assistance operation process of the XR is achieved.

It is understood that, in one embodiment, the XR operation system 100 executes an assistant operation of the cursor displayed in the XR device 110 with the help of the IMU data of the terminal device 120, thus the interaction speed of the XR operation system 100 is improved and the accuracy of the operation of the cursor by the XR device 110 is improved, therefore an operation experience of the XR device 110 is improved to the users.

In some embodiments, the XR device 110 is further configured to display a predefined posture guiding information based on the IMU data while the terminal device 120 is determined to be a non-initial posture based on the IMU data. The XR device 110 is further configured to display the cursor in an initial region and control the movement of the cursor based on the IMU data while the terminal device 120 is determined to be in an initial posture based on the IMU data.

Figure 2:
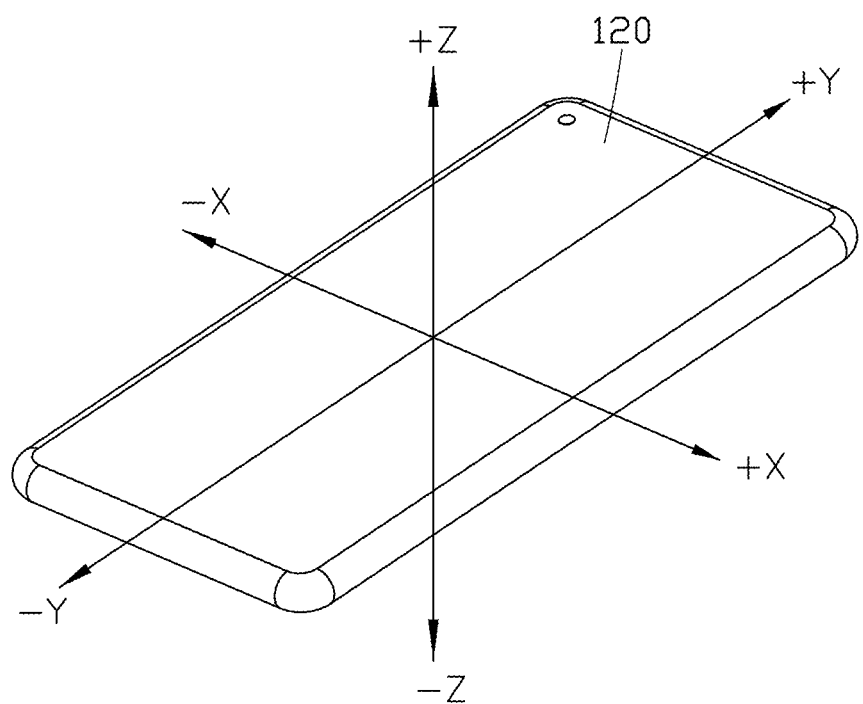
FIG. 2 is a diagram illustrating an embodiment of a terminal device in an initial posture, according to the present application.

As shown in FIG. 2, in the initial posture, the terminal device 120 faces up and in a horizontal state, the predefined posture guiding information may include information for prompting the users to make the terminal device 120 to be faced up and in the horizontal state. After responding to the started IMU function, while the XR device 110 confirms that the terminal device 120 is in the non-initial posture based on the initial received IMU data, the XR device 110 may display the predefined posture guiding information based on the IMU data, for guiding the users to adjust the posture of the terminal device 120 to be the initial posture. While the XR device 110 confirms that the terminal device 120 is in the initial posture, the XR device 110 displays the cursor in an initial region and controls the movement of the cursor based on the IMU data. The initial region may be a center region of a display region of the XR device 110.

After the XR device 110 confirms that the terminal device 120 is in the initial posture, the XR device 110 may construct a current posture coordinate system with a coordinate axis based on the IMU data, which is convenient to detect the posture of the terminal device 120 based on the IMU data and control the cursor to move based on the posture of the terminal device 120. For example, while the terminal device 120 is in the initial posture, the XR device 110 may construct an X axis, a Y axis, and a Z axis of the terminal device 120 as shown in FIG. 2 based on the IMU data.

In some embodiments, the XR device 110 is further configured to control the cursor to move upwardly or downwardly while the terminal device 120 is determined to rotate around a first direction based the IMU data, and control the cursor to move side-to-side while the terminal device 120 is determined to rotate around a second direction based on the IMU data.

It is understood that, the first direction is parallel with the X axis as shown in FIG. 2, the second direction is parallel with the Z axis or Y axis, but not being limited. The XR device 110 further detects a rotation angle of the terminal device 120 around a corresponding axis, a corresponding movement distance, and a corresponding display border, based on the IMU data. The cursor is inhibited to be moved out of the display border. For example, while the terminal device 120 rotates around the X axis at +45 degrees, the display border is an upper display border. While the terminal device 120 rotates around the X axis at −45 degrees, the display border is a lower display border. While the terminal device 120 rotates around the Z axis at +75 degrees, the display border is a left display border. While the terminal device 120 rotates around the Z axis at −75 degrees, the display border is a right display border.

Further, the XR device 110 further may display an option of touch function on the display. The XR device 110 further transmits a touch switched-on instruction, which indicates the touch function is started while the user has selected the option of touch function, to the terminal device 120 in response to starting the touch function. After receiving the touch switched-on instruction, the terminal device 120 acquires touch data in an interface of the predefined program in real time and transmits the acquired touch data to the XR device 110 in response to the touch switched-on instruction. The XR device 110 receives the touch data from the terminal device 120. The XR device 110 displays the cursor and controls the movement of the cursor based on the touch data.

The XR device 110 may convert the touch data into touch coordinates after receiving the touch data. The XR device 110 may display the cursor, and controls the movement of the cursor based on the touch coordinates.

In some embodiments, the terminal device 120 further displays a predefined number of calibration positions in the interface of the predefined program in response to the touch switched-on instruction, receives calibration touch data while at least one of the calibration positions is touched, executes a touch calibration based on the calibration touch data, acquires the touch data generated in the interface of the predefined program in real time after the touch calibration, and transmits the touch data to the XR device 110. The terminal device 120 further generates a prompt information in response to the touched calibration position.

For example, there are five calibration positions evenly distributed in the interface of the predefined program. The terminal device 120 generates calibration touch data and transmits to the XR device 110, in response to long pressing one of the calibration positions.

Further, an option of key input function is displayed on the display. The XR device 110 further transmits a key switched-on instruction, which indicates a key input function being started while the user has selected the option of key input function, to the terminal device 120 in response to starting the key input function. The terminal device 120 displays corresponding touch keys in a predefined region of the interface of the predefined program in response to the key switched-on instruction, and transmits corresponding key signal to the XR device 110 after at least one of the touch keys is triggered. The XR device 110 executes a controlling logic corresponding to the key signal and displays a corresponding content in response to the key signal. For example, a text input keyboard or game buttons is displayed in the interface of the predefined program, but not being limited.

It is understood that, while using the terminal device 120 to assist the XR device 110, at least one function of the foregoing embodiments, such as the IMU function and the touch function are switched on at the same time, or the IMU function and the key input function are switched on at the same time, or the touch function and the key input function are switched on at the same time, or the IMU function, the touch function, and the key input function are switched on at the same time. Therefore, an interaction speed and an experience degree of the XR device 110 are further improved.

Figure 3:
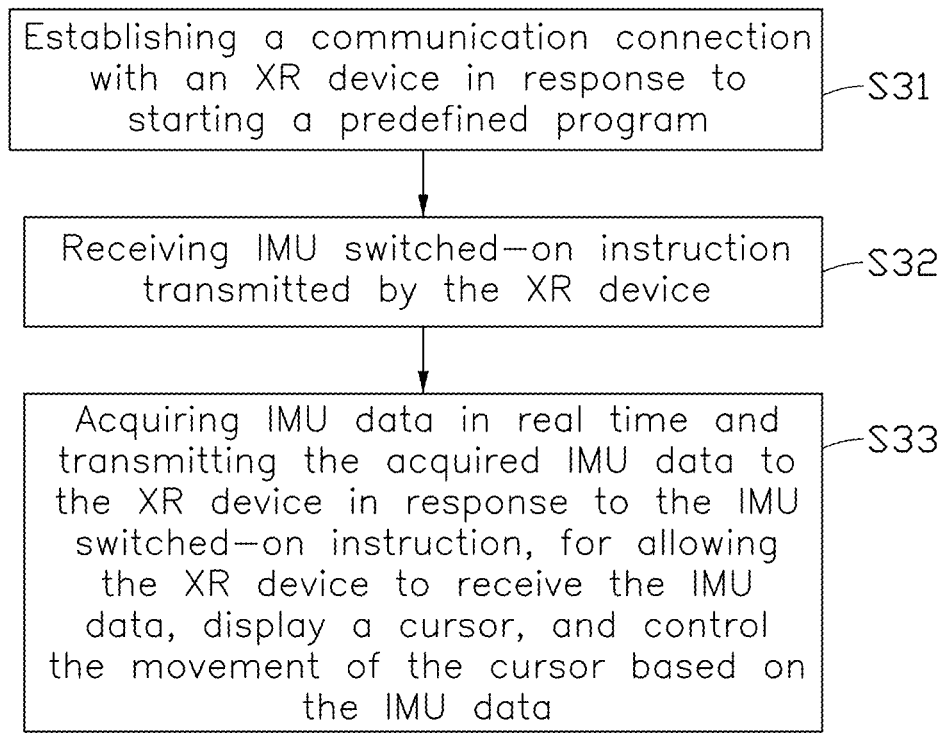
FIG. 3 is a flowchart illustrating an embodiment of a method of extended reality operation applied in a terminal device, according to the present application.

Referring to FIG. 3, FIG. 3 shows a flowchart of an embodiment of a method of XR operation provided by the present application. The method is applied on a terminal device. The method includes following steps.

In block S31, a communication connection with an XR device is established in response to starting a predefined program.

In block S32, an IMU switched-on instruction, which indicates that an IMU function is started while the user has selected an option of IMU function displayed on a display of the XR device, transmitted from the XR device is received.

In block S33, IMU data is acquired in real time and transmitted to the XR device in response to the IMU switched-on instruction, for receiving the IMU data by the XR device, displaying a cursor, and controlling the movement of the cursor.

Figure 4:
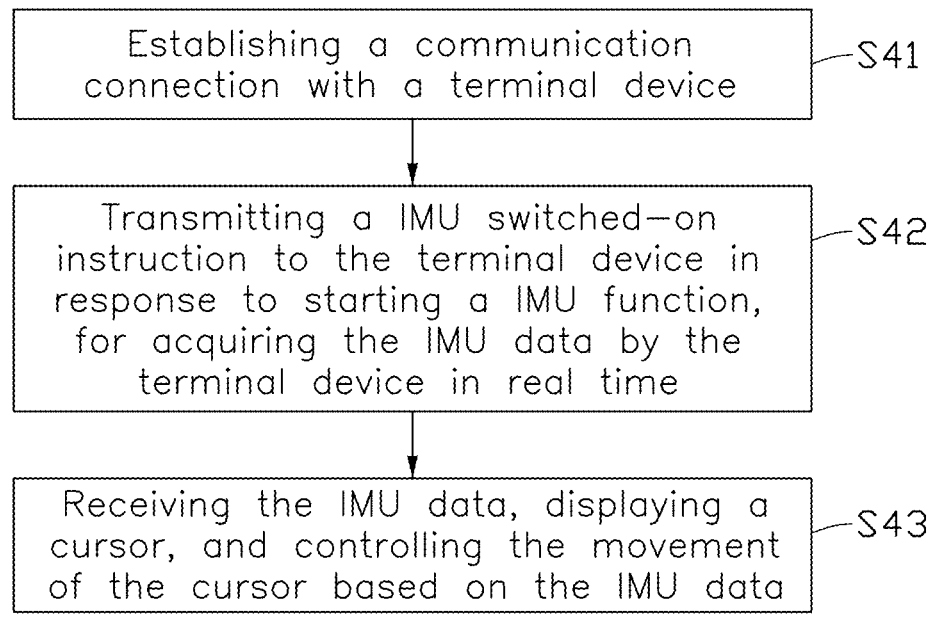
FIG. 4 is a flowchart illustrating an embodiment of a method of extended reality operation applied in an extended reality device, according to the present application.

Referring to FIG. 4, FIG. 4 shows a flowchart of another embodiment of a method of XR operation provided by the present application. The method is applied on an XR device. The method includes following steps.

In block S41, a communication connection with the terminal device is established.

In block S42, an IMU switched-on instruction, which indicates that an IMU function is started while the user has selected an option of IMU function displayed on a display of the XR device, is transmitted to the terminal device in response to starting the IMU function, for acquiring IMU data by the terminal device in real time.

In block S43, the IMU data is received, a cursor is displayed, and the movement of the cursor is controlled based on the IMU data.

Figure 5:
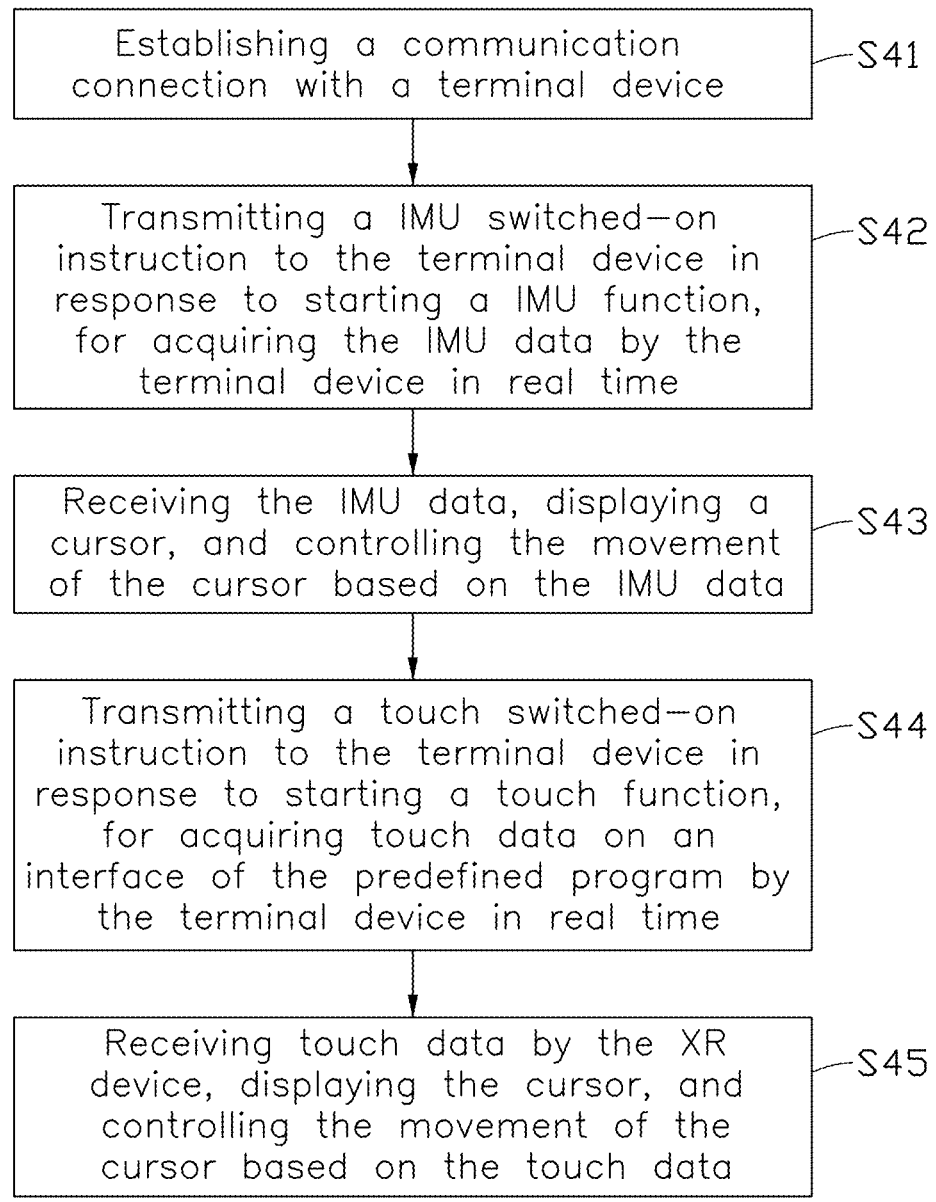
FIG. 5 is a flowchart illustrating another embodiment of a method of extended reality operation applied in an extended reality device, according to the present application.

In some embodiments, as shown in FIG. 5, the method of XR operation further includes following steps.

In block S44, a touch switched-on instruction, which indicates that a touch function is started while the user has selected an option of touch function displayed on a display of the XR device, is transmitted to the terminal device in response to starting the touch function, for acquiring touch data on an interface of the predefined program by the terminal device in real time.

In block S45, the touch data is received by the XR device, the cursor is displayed and the movement of the cursor is controlled based on the touch data.

In one embodiment, the beneficial effect of the method of XR operation of the present disclosure can refer to the detailed description of the foregoing method of XR operation. Details are not described herein again.

The present application also provides a computer readable storage medium. The computer readable storage medium stores computer programs or codes, when being executed to perform the foregoing method of XR operation.

The above embodiments may be fully or partially implemented through software, hardware, firmware or any combination thereof. When the embodiments are fully or partially implemented in the form of a computer program product, the computer program product includes one or more computer instructions. When the computer program instructions are loaded or executed on the computer, the process or function described in accordance with the embodiments of the present application is fully or partially generated. The computer may be a general purpose computer, a special purpose computer, a computer network, or other programmable device. The computer instructions can be stored in a computer readable storage medium, or transmit from a computer readable storage medium to another computer readable storage medium. For example, the computer instructions can be transmitted from a web site, computer, server, or data center through the cable (such as a coaxial cable, optical fiber, digital subscriber line (DSL)) or wireless (such as infrared, radio, microwave, etc.) to another web site, computer, server, or data center. The computer readable storage medium may be any available medium that the computer can access, or a data storage device that contains a server, a data center and the like that is integrated by one or more available medias. The available media may be magnetic media (for example, floppy disk, hard disk, magnetic tape), optical media (for example, DVD), or semiconductor media (for example, Solid State Disk (SSD)).

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium includes: any medium that can store program code, such as a ROM, a RAM, a magnetic disk, or an optical disc. If there is no conflict, the technical features in embodiments and implementations of this application may be randomly combined.

Those skilled in the art will recognize that the above described embodiments are only intended to illustrate the invention and are not intended to limit the invention, and numerous possible modifications and variations within the spirit of the invention will fall within the scope of the invention.

What is claimed is:

1. An extended reality (XR) operation system comprising:
   a terminal device, configured to establish a communication connection with an XR device after starting a predefined program; and
   the XR device, configured to transmit an Inertial Measurement Unit (IMU) switched-on instruction, which indicates that an IMU function is started, to the terminal device in response to starting the IMU function,
   wherein the terminal device acquires IMU data and transmits the IMU data to the XR device in response to the IMU switched-on instruction; the XR device receives the IMU data, displays a cursor, and controls a movement of the cursor based on the IMU data.

2. The XR operation system of claim 1, wherein the XR device further transmits a touch switched-on instruction, which indicates that a touch function is started, to the terminal device in response to starting the touch function; the terminal device further acquires touch data in an interface of the predefined program in real time in response to the touch switched-on instruction; the XR device further receives the touch data, displays the cursor, and controls the movement of the cursor based on the touch data.

3. The XR operation system of claim 1, wherein the XR device further transmits a key switched-on instruction, which indicates that a key input function is started, to the terminal device in response to starting the key input function; the terminal device displays corresponding touch keys in a predefined region of an interface of the predefined program in response to the key switched-on instruction; the terminal device further transmits a corresponding key signal to the XR device after at least one of the touch keys is triggered; the XR device executes a control logic corresponding to the corresponding key signal and displays a corresponding content in response to the corresponding key signal.

4. The XR operation system of claim 1, wherein the XR device is further configured to display a predefined posture guiding information based on the IMU data while the terminal device is determined to be a non-initial posture based on the IMU data; the XR device is further configured to display the cursor in an initial region and control the movement of the cursor based on the IMU data while the terminal device is determined to be in an initial posture based on the IMU data.

5. The XR operation system of claim 1, wherein the XR device is further configured to control the cursor to move upwardly or downwardly while the terminal device is determined to rotate around a first direction based on the IMU data.

6. The XR operation system of claim 1, wherein the XR device is further configured to control the cursor to move side-to-side while the terminal device is determined to rotate around a second direction based on the IMU data.

7. The XR operation system of claim 2, wherein the terminal device is further configured to display a predefined number of calibration positions in the interface of the predefined program in response to the touch switched-on instruction; the terminal device is further configured to receive calibration touch data while at least one of the calibration positions is touched, execute a touch calibration based on the calibration touch data, acquire the touch data generated in the interface of the predefined program in real time after the touch calibration, and transmit the touch data to the XR device.

8. The XR operation system of claim 7, wherein the terminal device is further configured to generate a prompt information in response to the touched calibration position.

9. A method of extended reality (XR) operation applied in a terminal device, the method comprising:
establishing a communication connection with an XR device in response to starting a predefined program;
receiving an Inertial Measurement Unit (IMU) switched-on instruction, which indicates that an IMU function is started, transmitted from the XR device; and
acquiring IMU data in real time and transmitting the acquired IMU data to the XR device in response to the IMU switched-on instruction, for allowing the XR device to receive the IMU data, display a cursor, and control the movement of the cursor based on the IMU data.

10. The method of XR operation of claim 9, wherein the method further comprises:
displaying a predefined number of calibration positions in an interface of the predefined program in response to the touch switched-on instruction;
receiving calibration touch data while at least one of the calibration positions is touched;
executing a touch calibration based on the calibration touch data;
acquiring touch data generated in the interface of the predefined program in real time after the touch calibration; and
transmitting the touch data to the XR device.

11. The method of XR operation of claim 9, wherein the method further comprises:
generating a prompt information in response to the touched calibration position.

12. A method of extended reality (XR) operation applied in an XR device, the method comprising:
establishing a communication connection with a terminal device;
transmitting an Inertial Measurement Unit (IMU) switched-on instruction, which indicates that an IMU function is started, to the terminal device in response to starting a IMU function, for acquiring IMU data by the terminal device in real time; and
receiving the IMU data, displaying a cursor, and controlling a movement of the cursor based on the IMU data.

13. The method of XR operation of claim 12, wherein the method further comprises:
transmitting an touch switched-on instruction, which indicates that a touch function is started, to the terminal device in response to starting the touch function for acquiring touch data in an interface of the predefined program by the terminal device in real time; and
receiving the touch data, displaying the cursor, and controlling the movement of the cursor.

14. The method of XR operation of claim 12, wherein the method further comprises:
transmitting a key switched-on instruction, which indicates that a key input function is started, to the terminal device in response to starting the key input function for acquiring key signal by the terminal device in real time.

15. The method of XR operation of claim 12, wherein the method further comprises:
displaying a predefined posture guiding information based on the IMU data while the terminal device is determined to be a non-initial posture based on the IMU data; and
displaying the cursor in an initial region and controlling the movement of the cursor based on the IMU data while the terminal device is determined to be in an initial posture based on the IMU data.

16. The method of XR operation of claim 12, wherein the method further comprises:
controlling the cursor to move upwardly or downwardly while the terminal device is determined to rotate around a first direction based the IMU data.

17. The method of XR operation of claim 12, wherein the method further comprises:
controlling the cursor to move side-to-side while the terminal device is determined to rotate around a second direction based on the IMU data.

* * * * *